United States Patent [19]
Seals

[11] Patent Number: 5,357,643
[45] Date of Patent: Oct. 25, 1994

[54] MULTIPURPOSE TOOL AND BICYCLE SEAT CLAMP COMBINATION

[76] Inventor: Robert L. Seals, 13524 Autumn La., Chico, Calif. 95926

[21] Appl. No.: 144,495

[22] Filed: Nov. 1, 1993

Related U.S. Application Data

[63] Continuation of Ser. No. 994,267, Dec. 21, 1992, abandoned.

[51] Int. Cl.5 .................................................. B25F 1/00
[52] U.S. Cl. ............................................ 7/138; 7/165; 81/437; 280/281.1
[58] Field of Search ...................... 7/138, 165; 280/278, 280/281.1, 287; 87/437

[56] References Cited

U.S. PATENT DOCUMENTS

| | | |
|---|---|---|
| 322,208 | 12/1891 | Shaw . |
| 4,175,298 | 11/1979 | Muller et al. ............... 7/138 |
| 4,967,435 | 11/1990 | Seals . |
| 5,003,656 | 4/1991 | Loppnow . |
| 5,022,672 | 6/1991 | Kawai ................. 280/281.1 |

*Primary Examiner*—James G. Smith

[57] ABSTRACT

A multipurpose bicycle tool having a plurality of different sizes of wrenches for grasping screws, nuts, and bolt heads. A wheel spoke wrench is also provided. The tool also serves as a cam-action quick-release clamp or skewer for use in the pinch lugs of the seat tube of a bicycle for securing the seat post stationary within the seat tube, or for clamping either the front or rear wheel to the front fork or rear axle drop out plate of a bicycle.

1 Claim, 4 Drawing Sheets

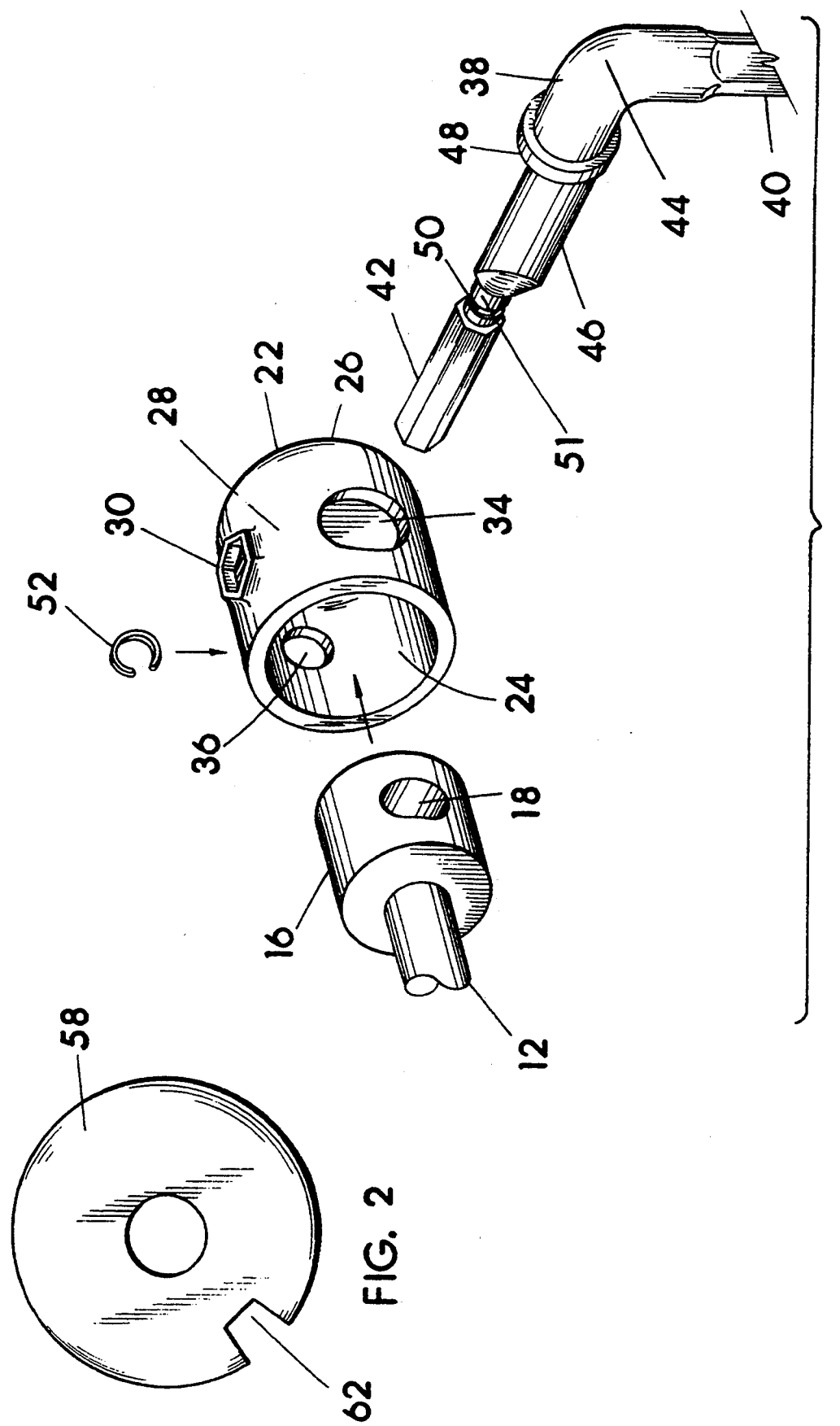

MULTIPURPOSE TOOL AND BICYCLE SEAT CLAMP COMBINATION

This is a continuation of Ser. No. 07/994,267, filed Dec. 21, 1992, now abandoned.

BACKGROUND OF THE INVENTION

1. Field of the Invention

This invention relates to a multipurpose tool which allows for the manipulation of fasteners including nuts, bolts, and screws on bicycles, wherein the tool also serves as a cam-action quick-release clamping mechanism for releasably clamping components of a bicycle together, such as with the pinch lugs of the seat tube of a bicycle, or for clamping either the front or rear wheel to the front fork or rear axle drop out plate of a bicycle.

2. Description of the Prior Art

There exist several multipurpose bicycle tools for implementing various repairs or adjustments while on the road. Two such devices include the multipurpose bicycle tool kit patented by Robert L. Seals, U.S. Pat. No. 4,967,435, and the multipurpose bicycle tool patented by Bob Shaw, U.S. Pat. No. 322,208. While both of these devices teach multipurpose tools structured for the repairing and adjusting of bicycles, both must be transported either on the person of the rider or in some specially structured compartment or storage area on the bicycle. There is always the disadvantage that the rider may lose or misplace the tool when it is carried on his person, and he must always take a concerted effort to remember to take it along to begin with. If the tool is not carried on the rider's person then a special bag or compartment must be provided to retain the tool. This not only takes up space on the frame of bicycle where it could incumber the rider, but the compartment is also an added expense. More importantly, both of the bicycle tools add weight to the bicycle and rider as a whole. This can be significant to racing bicyclists where every effort is made to reduce weight and increase speed.

Another past art multipurpose bicycle tool is taught in U.S. Pat. No. 5,003,656, issued to Loppnow. Loppnow's device is designed for direct attachment to the frame of the bicycle and therefore eliminates the need for a storage compartment or the rider to carry it. However, the Loppnow device still adds additional unwanted weight to the bicycle.

Therefore, there is a need for a multipurpose bicycle tool which functions to allow for repair or adjustment a variety of bicycle problems while out on the road, and which does not need to be carried on the rider's person and does not add additional weight to the bicycle.

SUMMARY

For the sake of briefness, the detailed description of the present invention in this disclosure is a description of the preferred embodiment, and not the only embodiment contemplated, and therefore must not be viewed in a limiting manner as the only mode for carrying out the present invention. The present invention is a multipurpose bicycle tool which not only functions to allow adjustment of the majority of the most common bicycle adjustments needed while on the road, but also serves as a replacement for an existing integral component of the bicycle itself, thus eliminating any extra weight. One existing component of a bike which may be replaced by my invention is normally referred to as the skewer, or the quick release clamping structure which serves to retain the bicycle seat post in position within the seat tube. The remainder of this disclosure will primarily discuss replacing the conventional bike seat skewer with the present invention, however it should be realized that the present invention can also be used as a quick-release clamp for the front wheel to front fork connection of a bicycle, or for the rear wheel to rear axle drop out plate connection, as those skilled in the art will readily appreciate with continued reading and study of my drawings. A conventional skewer, as does the present invention, includes a manually operable cam lever which functions in conjunction with the pinch lugs of the seat tube to squeeze the seat tube tightly onto the seat post. This clamping mechanism, when in the loosened position allows the seat post to be repositioned vertically within the seat tube without removing nuts or having to use tools other than the hands.

One aspect of the present invention is to serve as a skewer quick release clamping mechanism for use in combination with the pinch lugs of the seat tube. The present invention includes a widened movable housing having two different sized socket wrenches, and also containing an L-shaped handle retained within a central bore of the housing. The distal ends of the handle are formed into two different sizes of hexagonal wrenches commonly referred to as allen wrenches. A partially threaded shaft opposite the housing end of the tool also possesses a third size of hexagonal wrench. Removably retained to the threaded portion of the shaft is a nut which is used to retain the component parts together on the pinch lugs of the bicycle seat tube. Two washers are also preferably included, one of which possesses a tapered notch which serves as a spoke wrench for different sizes of wheel spokes.

The portion of the handle retained within the central bore of the housing contains a cam which functions with certain components of the invention, when in use, to provide a manually operable quick release clamping mechanism for securing the seat post within the seat tube.

The present invention not only serves as a valuable bicycle tool, allowing for the manipulation of many fasteners such as nuts, bolts and screws typically found on a bicycle, but also serves as an integral component of the bicycle to assist in stabilizing the seat in position. On a typical bike, particularly a mountain bike, the present invention includes enough tool sizes and types to normally allow adjustments to be made to most of the brake components, the bike seat, the gear shifting and derailer components, cable saddles and supports, and most accessory mounts such as for items like drinking water bottles for example. The tool is readily available to the rider at any time and can be readily removed entirely from the pinch lugs on the seat tube without accessory tools. The seat posts of bicycles are generally tightly inserted into the seat tube and normally will not slip down out of adjustment when the skewer or tool is removed. With the present invention, the bicycle rider is additionally relieved of the duty of remembering to take the bicycle tool with him when he goes on a ride, and he is further relieved of having to find a suitable place to carry or store the tool while riding. Furthermore, there is no appreciable excess weight added to the bicycle since the present invention weighs approximately the same as conventional quick release skewers found on bicycles.

Other structural and functional features, advantages and benefits of the present invention will become more

BRIEF DESCRIPTION OF THE DRAWINGS

FIG. 2 is a top plan view of the washer which serves as the spoke wrench;

FIG. 3 is a partial exploded perspective view of the present invention illustrating the head of the threaded shaft positioned for insertion into the housing, and the hexagonal wrench or handle portion positioned for insertion through the apertures of the housing;

DESCRIPTION OF A PREFERRED EMBODIMENT

Figure 1:
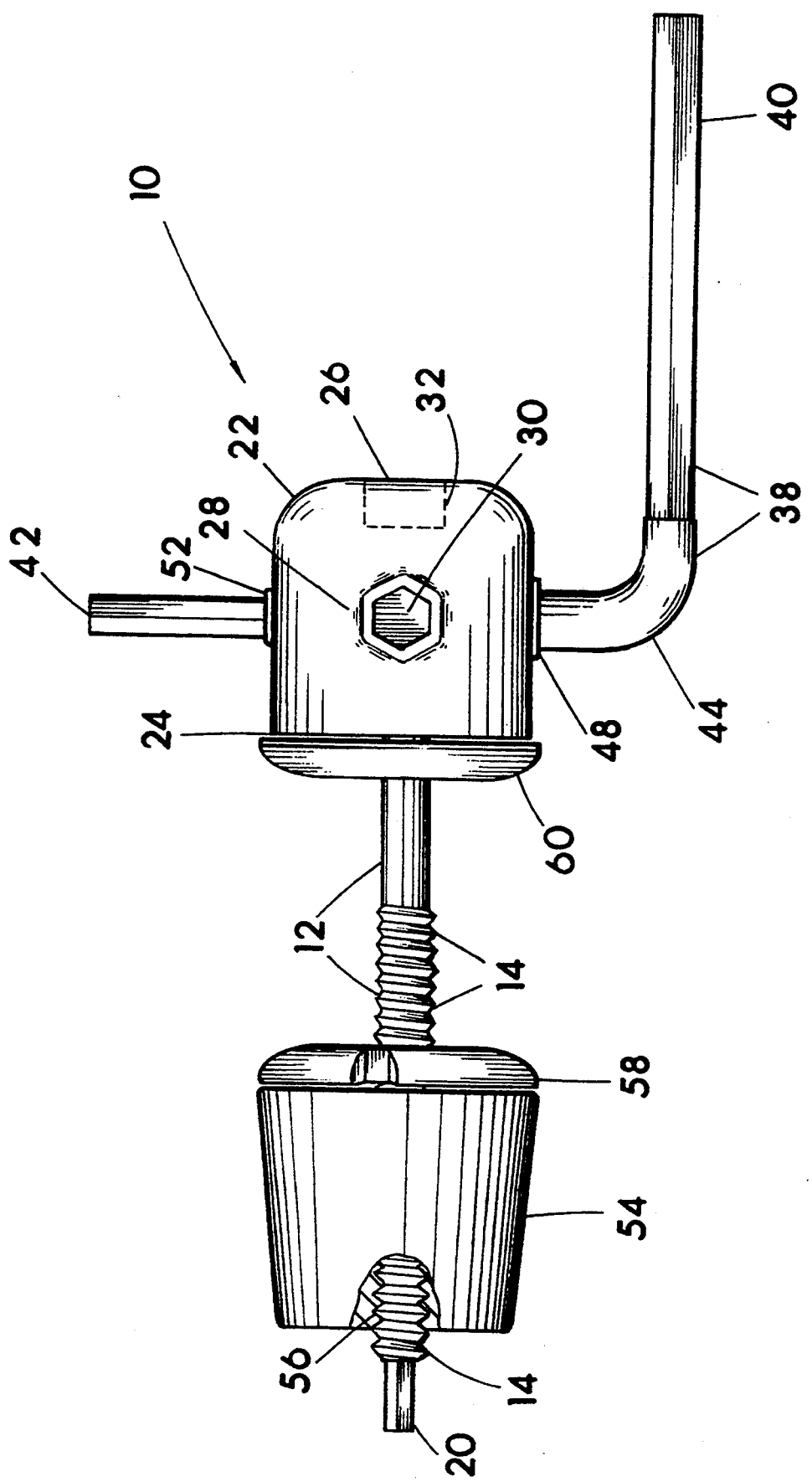
FIG. 1 is a front elevational view of a structural embodiment of the present invention.
Figure 4:
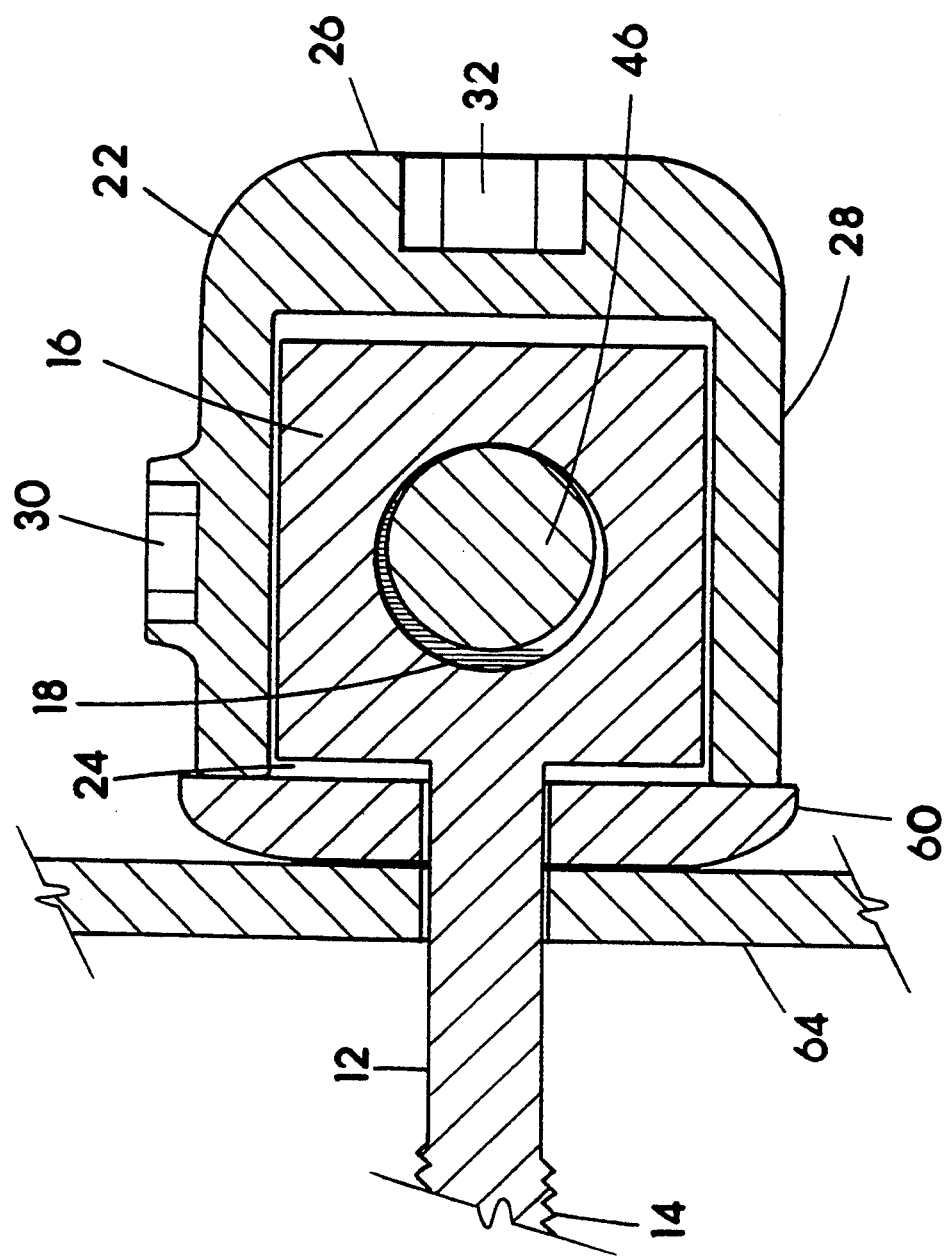
FIG. 4 is a partial cross section of the invention illustrating the head of the threaded shaft inserted into the housing with a washer separating the housing from a wall of one of the pinch lugs. The cam or eccentric portion of the handle is shown forcing the interior wall of the head aperture to the right which in this illustration is the tightened or clamped position.
Figure 5:
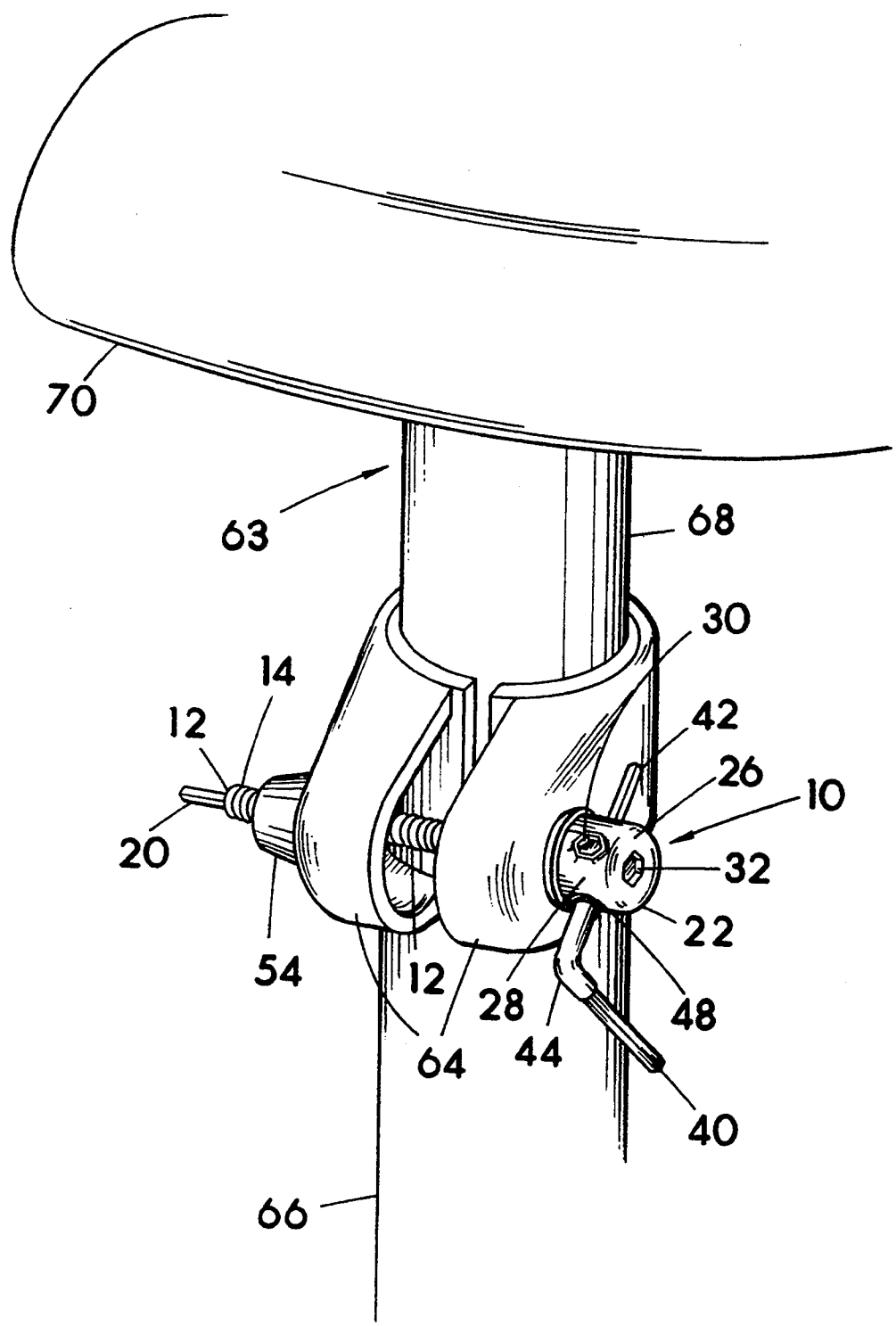
FIG. 5 is a perspective rear view of the bicycle seat area showing the invention in use affixed to the pinch lugs retaining the seat post stationary within the seat tube.

Referring now to the drawings where a preferred embodiment of the present invention, generally referred to as bicycle tool 10, is illustrated in various views. Preferably, bicycle tool 10 is comprised of steel, although other suitably rigid and strong materials can be used, such as titanium. Bicycle tool 10 includes an elongated cylindrical shaft 12 having threads 14 beginning near hexagonal wrench 20 at a first end of the shaft 12 and extending up the shaft 12 approximately three fourths of the way toward a short widened cylindrical head 16 affixed on the second end of shaft 12. Head 16 has a transverse bore or opening 18 therethrough, with the bore or opening 18 positioned lengthwise perpendicular to the lengthwise axis of shaft 12. The small hexagonal wrench 20 (allen wrench) on shaft 12 is preferably 4 mm in size, best shown in FIG. 1. Movably or slidably retained over head 16 is housing 22. Housing 22 comprises a cylindrical cap having one end 24 for insertion of head 16, and having an opposite closed end 26. The exterior surface of sidewall 28 of housing 22 possesses a raised area formed into a hexagonal socket 30, preferably 9 mm in size, best shown in FIG. 3. The exterior surface of the closed end 26 of housing 22 possesses a recessed hexagonal socket 32 which is approximately 10 mm in size, as shown in FIG. 4 and 5. Housing 22 has two oppositely disposed apertures through the sidewall 28, the first being a larger aperture 34 and the second a smaller aperture 36, best shown in FIG. 3. Both apertures 34 and 36 are sized for insertion of a section of the L-shaped handle 38. Handle 38 is roughly a thin cylindrical metal rod formed into a right angle rendering the handle into the L-shape, with both ends formed into hexagonal wrenches (allen wrenches). One end is formed into hexagonal wrench 40 preferably 6 mm in size, with this section serving mainly as the gripping or leverage area. The opposite end of handle 38 is structured into a second hexagonal wrench 42 approximately 5 mm in size, best shown in FIG. 3. The area of handle 38 positioned between the bend or elbow 44 and wrench 42 includes an enlarged cylindrical section referred to as eccentric cam 46, positioned off to one side of the center axis of this portion of the handle 38, also best shown in FIG. 3. Eccentric cam 46 functions in conjunction with opening 18 of head 16 because of the relative size and position of the cam to the size of the opening 18, along with housing 22 to create a camming action to move head 16 and housing 22 relative to each other, and which will be further explained later. A widened annular shoulder 48 is affixed onto handle 38 between elbow 44 and eccentric cam 46, shown in FIG. 3. Located between eccentric cam 46 and wrench 42 is an annular groove 50 structured for receiving a retaining ring commonly referred to as C-ring 52. For the initial assembling of the tool at the factory, head 16 of shaft 12 is inserted into the interior of housing 22 with opening 18 aligned with apertures 34 and 36 of housing 22. Hexagonal wrench 42 of handle 38 is inserted first through aperture 34, then into and through aligned opening 18 and then brought out through aperture 36 until groove 50 just exits aperture 36. C-ring 52 is then inserted over groove 50, securing handle 38 rotatably in position. The widened shoulder 48 adjacent elbow 44 of handle 38 now rests within aperture 34, preventing transverse movement of eccentric cam 46 within opening 18 but still allowing rotation. The further movement of handle 38 or wrench 42 outward beyond aperture 36 is limited by the abutment of the adjacent end of cam 46 against the material defining aperture 36 within housing 22. The material around or defining aperture 34 provides a bearing surface for the annular shoulder 48 which as will be better understood with continued reading, allows for moving housing 22 inward and out relative to head 16 with cam action, and thus tightening when used on the pinch lugs of bike. A bearing contact between annular area 51 on handle 38 and the material defining aperture 36 also exists. The bearing surfaces play a role in maintaining the proper position of the cam 46 and its supporting handle portion relative to housing 22 and opening 18 of head 16. Releasably affixed to threads 14 of shaft 12 is nut 54. Nut 54 is a cylinder having a central bore with internal threads 56 sized for threaded connection to threads 14 of shaft 12. Two washers, washer 58 and washer 60 are slidably positioned over shaft 12 between nut 54 and head 16 or housing 22, when in use. Washer 58 is modified with tapered notch 62, wider at the mouth than at the closed end, which allows washer 58 to serve as a tapered spoke wrench when removed from connection from the other components of bicycle tool 10. Notch 62 can accommodate the majority of spoke bases found on most bicycles in use today, which is primarily includes 4 and 5 mm sizes, being utilized to tighten or remove the effected spoke.

To affix bicycle tool 10 onto bicycle 63, the old skewer must first be removed if present from the pinch lugs 64 located at the top of the seat tube 66. Pinch lugs 64 can be a separate unit or can be affixed to seat tube 66 as shown in FIG. 5. With nut 54 and the adjacent washer 58 removed, shaft 12 is then inserted through the apertures of both pinch lugs 64. Washer 58 is then reinserted over shaft 12 followed by nut 54. Nut 54 is then tightened manually over threads 14 until washers 58 and 60 are tightly abutted against the sidewalls of pinch lugs 64. To secure seat post 68 within seat tube 66 and provide adequate clamping pressure against pinch lugs 64 the camming action of bicycle tool 10 is activated by rotating handle 38 until the tightening effect is felt. Eccentric cam 46 is positioned within opening 18 of head 16 and rotation of handle 38 causes the highest portion of eccentric cam 46 to be rotated to where it pushes against the interior top wall of opening 18 as shown in FIG. 4, causing head 16 to be repositioned away from pinch lugs 64 which has the effect of drawing nut 54 and washer 58 toward the adjacent pinch lug 64, and also moving head 16 further upward within housing 22 toward the closed end of the housing, simultaneously with housing 22 and the adjacent washer 60 being moved with pressure toward the adjacent respective pinch lug 64 thus providing the camming action which clamps or brings both pinch lugs 64 toward one another and tightening seat tube 66 around seat post 68. This procedure and camming structure is essentially the same as the camming action found in existing conventional skewers which provide the clamping action for securing the bicycle seats 70 in a stable position without the use of a wrench or other accessory equipment, and should be readily understood by those skilled in the art.

To detach bicycle tool 10 from pinch lugs 64 for use in adjusting components of the bicycle, handle 38 is first rotated to release the cam action of eccentric cam 46 by rotating the cam 46 to the side away from the interior top of bore 18 and thus loosening the clamp, at which point the height of the seat 70 could be adjusted if desired. Nut 54 and washer 58 are then manually removed with the fingers from shaft 12, and shaft 12 removed from the pinch lug apertures. Wrenches 20, 40 and 42 can all be used with handle 38 affixed to housing 22. Handle 38 or shaft 12 can be used as leverage when using both sockets 30 and 32. Washer 58 is sufficiently large to be grasped in the fingers and used as a spoke wrench. Thus, on a typical bike, particularly a mountain bike, the present invention includes enough tool sizes and types to normally allow adjustments to be made to most of the brake components, the bike seat, the gear shifting and derailer components, cable saddles and supports, and most accessory mounts such as for items like drinking water bottles for example.

Although I have very specifically described the preferred structures of the present invention, it should be understood that the specific details are just that, "preferred" and "best" given for example to those skilled in the art. Changes in the specifics described, such as the tool types, particular sizes and number thereof may obviously be made without departing from the true scope of the invention, and therefore it should be understood that the scope of the invention is not to be overly limited by the specification and drawings given for example, but is to be determined by the spirit and intended scope of the appended claims.

What I claim as my invention is:

1. A combination of a bicycle seat attached to a seat post with said seat post inserted into a bicycle seat tube, a pair of pinch lugs on said seat tube squeezing said seat tube tightly onto said seat post, said pinch lugs squeezed together by a cam-action quick-release clamp removably connected to said pinch lugs, said cam-action quick release clamp comprising an elongated shaft having a first end and a second end, said elongated shaft having threads thereon beginning adjacent said first end and extending a distance toward said second end of said elongated shaft, a nut having a threaded bore threadably engaged with said threads of said elongated shaft, said second end of said elongated shaft having an affixed head, a housing movably placed over said head, said housing having at least one exposed hexagonal socket thereon for manipulating fasteners, an L-shaped handle having a first exposed end fashioned into a first size hexagonal wrench, said handle having a second exposed end fashioned into a hexagonal wrench sized differently relative to said first size hexagonal wrench, a portion of said handle between the first and second exposed ends of the handle rotatably positioned and retained within said housing, said portion of said handle within said housing including a cam positioned relative to said head so that movement of said handle and thus said cam results in repositioning said housing relative to said head, said hexagonal socket of said housing and the hexagonal wrenches of said handle suitably structured for manipulating fasteners such as bolts and the like on a bicycle when said cam-action quick release clamp is removed rom said pinch lugs.

* * * * *